(12) United States Patent
Alam et al.

(10) Patent No.: US 11,381,636 B2
(45) Date of Patent: Jul. 5, 2022

(54) NETWORK FUNCTION EXECUTION IN INFORMATION CENTRIC NETWORKS

(71) Applicant: Intel Corporation, Santa Clara, CA (US)

(72) Inventors: S M Iftekharul Alam, Hillsboro, OR (US); Stepan Karpenko, San Jose, CA (US); Satish Chandra Jha, Hillsboro, OR (US); Yi Zhang, Portland, OR (US); Kuilin Clark Chen, Hillsboro, OR (US); Kathiravetpillai Sivanesan, Portland, OR (US); Gabriel Arrobo Vidal, Hillsboro, OR (US); Srikathyayani Srikanteswara, Portland, OR (US); Hassnaa Moustafa, Portland, OR (US); Eve M. Schooler, Portola Valley, CA (US); Sebastian Schoenberg, Hillsboro, OR (US); Venkatesan Nallampatti Ekambaram, Hillsboro, OR (US); Ravikumar Balakrishnan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 16/457,402

(22) Filed: Jun. 28, 2019

(65) Prior Publication Data
US 2020/0259885 A1    Aug. 13, 2020

(51) Int. Cl.
*H04L 67/10* (2022.01)
*G06F 9/44* (2018.01)
*H04W 4/029* (2018.01)

(52) U.S. Cl.
CPC .............. *H04L 67/10* (2013.01); *G06F 9/44* (2013.01); *H04W 4/029* (2018.02)

(58) Field of Classification Search
CPC ... H04L 67/2842; H04L 67/327; H04L 67/10; H04L 67/12; H04L 43/08; H04L 45/306;
(Continued)

(56) References Cited

U.S. PATENT DOCUMENTS

| | | | |
|---|---|---|---|
| 10,075,401 B2 * | 9/2018 | Mosko | .................. H04L 51/14 |
| 2014/0351929 A1 * | 11/2014 | Mahadevan | ........ H04L 63/1408 726/22 |

(Continued)

OTHER PUBLICATIONS

Dennis Grewe "A network stack for computation-centric vehicular networking", 2 pages (Year: 2018).*
(Continued)

*Primary Examiner* — Michael A Keller
*Assistant Examiner* — Thao D Duong
(74) *Attorney, Agent, or Firm* — Schwegman Lundberg & Woessner, P.A.

(57) ABSTRACT

To address technical problems facing managing multiple sources of information from multiple vehicles, vehicular computing power may be exploited to process such information before sharing with others, which may help reduce network traffic overhead. A technical solution to improve this information processing over vehicular networks by using a hybrid Named Function Network (NFN) and Information Centric Network (ICN), such as in a hybrid NFN/ICN. An NFN may be used to orchestrate computations in a highly dynamic environment after decomposing the computations into a number of small functions. A function may include a digitally signed binary supplied by a car vendor or other trusted authority and executed within a controlled environment, such as a virtual machine, container, Java runtime-environment, or other controlled environment.

23 Claims, 9 Drawing Sheets

(58) Field of Classification Search
CPC . H04L 63/20; H04L 41/0893; H04L 41/5009; H04L 45/24; H04L 63/0428; G06F 21/602; G06F 11/1004; G06F 11/3058
See application file for complete search history.

(56) References Cited

U.S. PATENT DOCUMENTS

| | | | | |
|---|---|---|---|---|
| 2017/0251339 A1* | 8/2017 | Addepalli | ............... | G06F 3/167 |
| 2019/0028552 A1* | 1/2019 | Johnson, II | ............ | H04L 67/02 |
| 2019/0182356 A1* | 6/2019 | Ko | ........................ | H04W 4/20 |
| 2019/0327169 A1* | 10/2019 | Alam | ................... | H04L 45/306 |

OTHER PUBLICATIONS

Michal Krol "NFaaS: Named function as a service", 11 pages (Year: 2017).*

Lucas Wang "Data naming in vehicle-to-vehicle communications", 6 pages (Year: 2012).*

Barrett, Edd, "Virtual Machine Warmup Blows Hot and Cold", Proceedings of the ACM on Programming Languages, vol. 1, No. OOPSLA, Article 52, (Oct. 2017), 27 pgs.

Brueckner, Rich, "Amazon AWS develops their own ARM Chip—Are they Smarter than they Look?", Inside HPC https: insidehpc.com 2018 11 amazon-aws-develops-arm-chip-smarter-look , (Nov. 27, 2018), 2 pgs.

Grewe, Dennis, "A Network Stack for Computation-Centric Vehicular Networking", ICN 18, (2018), 2 pgs.

Krol, Michal, "NFaaS: named function as a service", In Proceedings of the 4th ACM Conference on Information-Centric Networking. ACM, (2017), 11 pgs.

Krol, Michal, "Rice: Remote method invocation in icn", Network Systems Research and Design, (2018), 39 pgs.

Tschundin, Christian, "Named functions and cached computations", . In IEEE Consumer Communications and Networking Conference, (2014), 7 pgs.

Vance, Ashlee, "Intel unveils Xeon chips for low-end servers", https: www.computerworld.com article 2577982 intel-unveils-xeon-chips-for-low-end-servers.html, (Nov. 18, 2002), 4 pgs.

* cited by examiner

NETWORK FUNCTION EXECUTION IN INFORMATION CENTRIC NETWORKS

TECHNICAL FIELD

Embodiments described herein generally relate to processing of data in an information centric network.

BACKGROUND

Advancements in autonomous driving technology is leading to a future where roads and highways will be full of smart and connected vehicles with increased computing and communication capabilities. This will open up opportunities for augmented information services where vehicles become sources, processors, or consumers of information at the same time. For example, an autonomous car continuously captures its surrounding environment via on-board sensors that may be source of information (e.g., image, radar, lidar). This may be particularly useful for a car that navigates based on the situation of the road ahead. However, it may be difficult to manage multiple sources of information from multiple vehicles.

Connected vehicles, autonomous vehicles, and Internet of Things (IoT) devices are generating an increasing volume of uplink traffic and requiring more real-time services. To support this uplink traffic and these real-time services, Edge and Fog computing are increasingly used, such as in-network deployment by carriers and in-service deployment by service providers. However, existing Edge Data Centers may not be able to cope with the Edge and Fog computing needs. This is especially true as these vehicles and devices generate a high volume of big data, including regional or local data, or data that includes non-permanent content that is continually refreshed or is used to provide real-time services.

Edge-to-cloud infrastructure, particularly large-scale projects spanning edge-to-cloud infrastructure, typically result in isolating the provided service functionality and the management of the infrastructure. Due to a lack of standardization in conveying timely status information of the infrastructure to an associated application, the application may be unable to adapt content-based behavior to the environment, especially in a dynamic, continuous, and transparent manner. What is needed is an improvement in edge-related computing infrastructure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
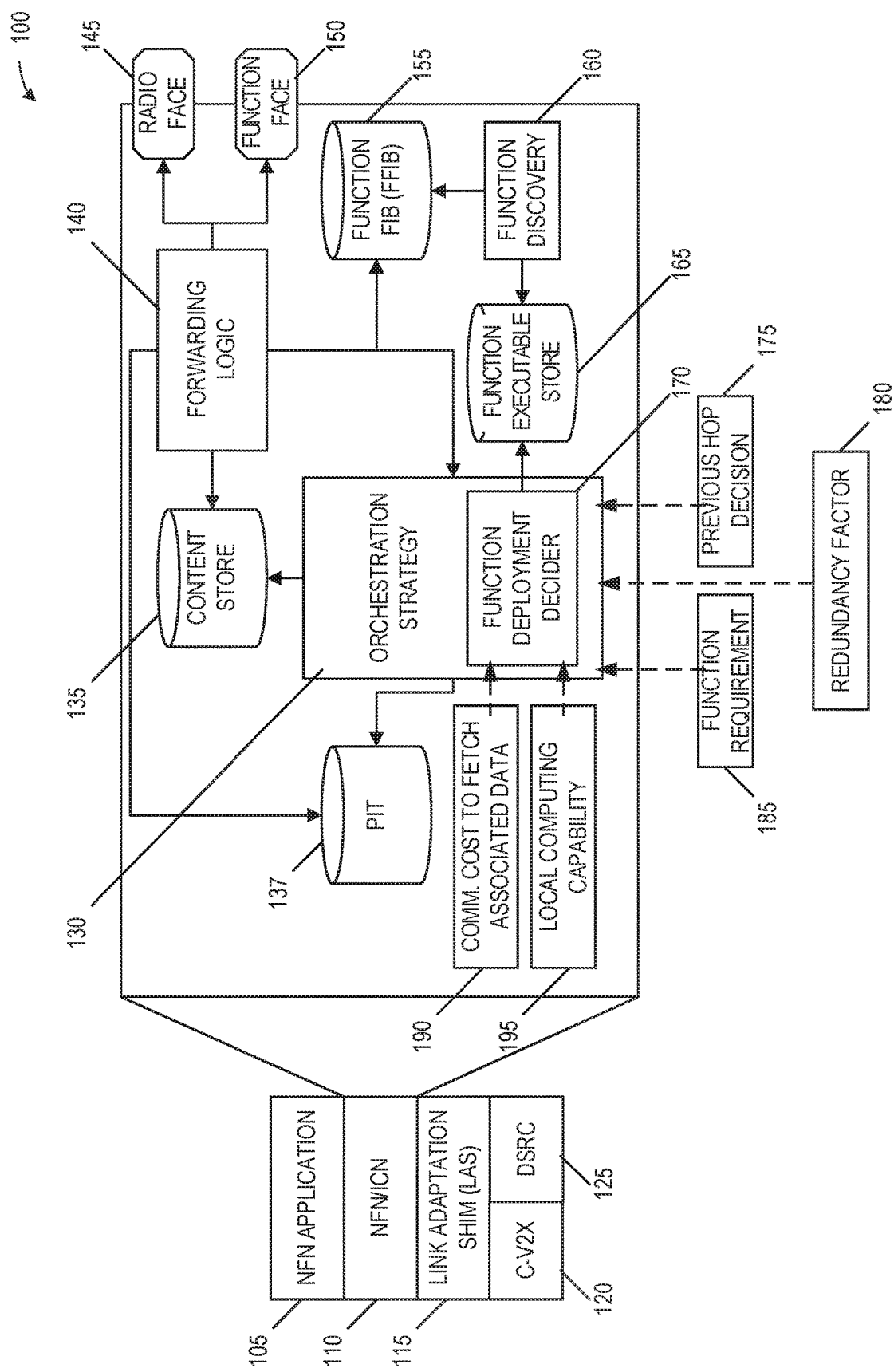
FIG. 1 is a block diagram of an example NFN/ICN system, according to an embodiment.

To address technical problems facing managing multiple sources of information from multiple vehicles, vehicular computing power may be exploited to process such information before sharing with others, which may help reduce network traffic overhead. A technical solution to improve this information processing over vehicular networks by using a hybrid Named Function Network (NFN) and Information Centric Network (ICN), such as in a hybrid NFN/ICN.

ICN is a networking paradigm that transitions from a host-centric content delivery model and to an information-centric model for content delivery. The end-to-end connectivity of modern computer networks allows for delivery of information that is independent of location, application, storage, and transportation means. Content is requested by a consumer device by submitting an interest packet that provides the information needed (e.g., a name, identifier, category, etc.) to retrieve content. In response, a node containing the content (e.g., a producer node, cache node, etc.) returns a data packet including the content. This reduces the reliance on specific hosts to provide content to a requester and allows data to be propagated throughout the ICN to nodes that may most efficiently delivery the content to consumer nodes.

NFN uses ICN principles (e.g., as an extension to traditional ICN) to perform in-network execution of expressions. An NFN may be used to orchestrate computations in a highly dynamic environment after decomposing the computations into a number of small functions. A function may include a digitally signed binary supplied by a car vendor or other trusted authority and executed within a controlled environment, such as a virtual machine, container, Java runtime-environment, or other controlled environment.

Virtual Machines (VMs) with Just-In-Time (JIT) compilers may execute programs in two phases. Initially, the initial warmup phase determines which parts of a program would most benefit from dynamic compilation, before JIT compiling those parts into machine code. Subsequently, the program is said to be at a steady state of peak performance. The warm-up phase may consume a relatively large amount of time, such as a few magnitudes of milliseconds. In a dynamic wireless network, a request for function execution may result in fetching input arguments or data from an area of interest in multi-hop fashion. Additionally, function executables may be instantiated on an edge node or on a capable intermediate (e.g., a node between requester and input data producer). Because of this, waiting for function code to warm up after fetching input data incurs additional latency. This additional latency may negatively affect time-sensitive applications or computing requests, especially for dynamic vehicular environments. The dynamic network topology imposes various additional reliability challenges, including the possibility that an intermediate vehicle responsible for executing a function may leave the network. To address these challenges, network dynamics may be taken into consideration when deploying or executing a function on vehicle to ensure that computing results are delivered reliably.

A technical solution to technical problems facing distributed function execution includes pre-launching a requested function executable on a redundant number of vehicles. This may include allowing an NFN interest packet (e.g., functional interest packet) to indicate a need for pre-launching a function and carry an indication of a number of vehicles allowed to execute the requested function. A Function Deployment Decider (FDD) may be used to decide whether a function should be deployed locally and pre-launched, a decision that may be based on function requirements, local computing capabilities, communication cost or distance to fetch function input data, allowed redundancy factor, and other decision factors. The FDD may be deployed in a centralized or clustered approach, or may be deployed in a de-centralized fashion. This solution reduces end-to-end compute and communication time (e.g., latency) for a given task and improves reliability by introducing controlled redundancy. This also improves over other solutions by considering pre-launching functions to reduce end-to-end latency, and by taking into consideration dynamics of vehicular environments and function offloading for Vehicle-to-Vehicle (V2V). The use of pre-launching may also enable detection of the use of the technical solutions described herein. For example, a control-flow-based reverse engineering technique may be used to determine if a function has been pre-launched and kept in waiting state before starting its actual execution.

FIG. 1 is a block diagram of an example NFN/ICN system 100, according to an embodiment. System 100 shows an example of the NFN/ICN that may be used for named function orchestration and execution over vehicular networks. Due to the strong location-dependency of the data and the broadcast nature of the wireless medium, system 100 coordinates interest packet forwarding and function orchestration strategies. Geo-location information is incorporated into an interest packet's name, which enables the forwarding layer to be aware of geo-location.

System 100 includes a Function Deployment Decider (FDD) 170 that determines whether a function should be deployed and pre-launched on a node to avoid a warm-up period, and whether the function should be deployed with redundancy. The FDD 170 may be implemented in a centralized fashion, such as on a cluster head or roadside units (RSUs). The FDD 170 may be implemented in a distributed fashion, such as over vehicle-to-vehicle (V2V) and vehicle-to-infrastructure (V2I) communication links.

To support system 100, the NFN/ICN layer 110 is aware of geo-location for each forwarding hop (e.g., forwarding segment). This geo-location awareness may be provided by a Link Adaptation Shim (LAS) 115 that sits between ICN/NFN 110 and radio access technology-specific layers, such as a cellular vehicle-to-everything (C-V2X) 120 or Dedicated Short Range Communication (DSRC) 125. The LAS 115 may embed location information into a packet header and pass the packet header to the ICN/NFN 110 to enable location-aware forwarding. In addition to the location information, the LAS 115 may add data to the packet header to indicate per-hop function deployment status during interest packet transfer. The location information may be provided by vehicles, which may determine precise location and time information via various geo-location systems (e.g., GPS). Real world maps may be divided into a number of rectangular grids with configurable dimensions, where each grid may be represented using a single identifier. Each vehicle may determine a grid area associated with its location, such as by using a pre-defined grid area location association function. Each vehicle may have a number of function executables stored locally, where the functions may have been previously downloaded from a trusted road side unit or when the vehicle was originally assembled or built. To reduce or eliminate security risks, the vehicles may be prevented from downloading function executables from one vehicle to another. A periodic function executable advertisement protocol may be used to share a list of available functions within an area, and may be used to provide a function Forwarding Information Base (FFIB) 155 for updating function executables.

As shown in FIG. 1, system 100 includes interactions among various layers and modules. In addition to specifying location of information to be processed and function processing parameters (e.g., delay targets), three additional fields may be added to an interest packet name: (i) a flag indicating whether pre-launching is allowed for the requested function, (ii) another flag indicating whether an application is interested in receiving partial computation results, and (iii) a number of redundant deployments per forwarding hop. An example of the additional fields added to an interest packet name may include "/roadView/location=geoArea3←/merge/delay_requirement=100 ms/pre_launching_allowed=true/partial_results_allowed=false/redundancy=2." Additionally, a "data processing status" tag may be included within a response packet or data packet, where the tag may be used by an intermediate node to determine whether a requested function has been executed to process the input data.

An orchestration strategy 130 may be used to reduce or eliminate communication overhead and propagation delay. For example, while orchestrating a function execution request or deciding which node should execute a function, the orchestration strategy may preferentially select executioners that are closer to data producers. This orchestration based on proximity to data producers reduces or eliminates communication overhead and propagation delay.

The FDD 170 may operate based on specific function deployment logic. This function deployment logic may be based on (i) proximity to data (e.g., cost of fetching data), (ii) function requirements specified in the interest packet and local computing capability (e.g., CPU utilization, memory consumption), or (iii) knowledge about existing vehicle area deployment and a redundancy factor specified by the interest packet. Multiple vehicles within a neighborhood area may pre-launch one function in redundant fashion based on criteria for that vehicle. For example, the vehicle may pre-launch the function if the vehicles are close to the producer of a function input parameter or data, if the vehicle is capable of meeting required function requirements based on their available computing resources, and if the total number of vehicles does not exceed the number of allowed redundant vehicles within a neighborhood.

A pending interest table (PIT) 137 may be used to provide a timer adjustment. Upon confirmation from the FDD 170, the forwarding logic 140 may create two PIT entries: one entry with the original interest packet name and a corresponding face set to a radio interface, and another entry with only a data part of the name and corresponding face set to a function execution interface. The lifetime of the first PIT entry may be set to a data waiting timer plus estimated function execution time, which may reduce or eliminate the likelihood that the PIT entry expires before the function execution is complete. The second PIT entry may help to pass input parameters to a pre-launched function, once input data is received from one or more neighboring producers.

Figure 2:
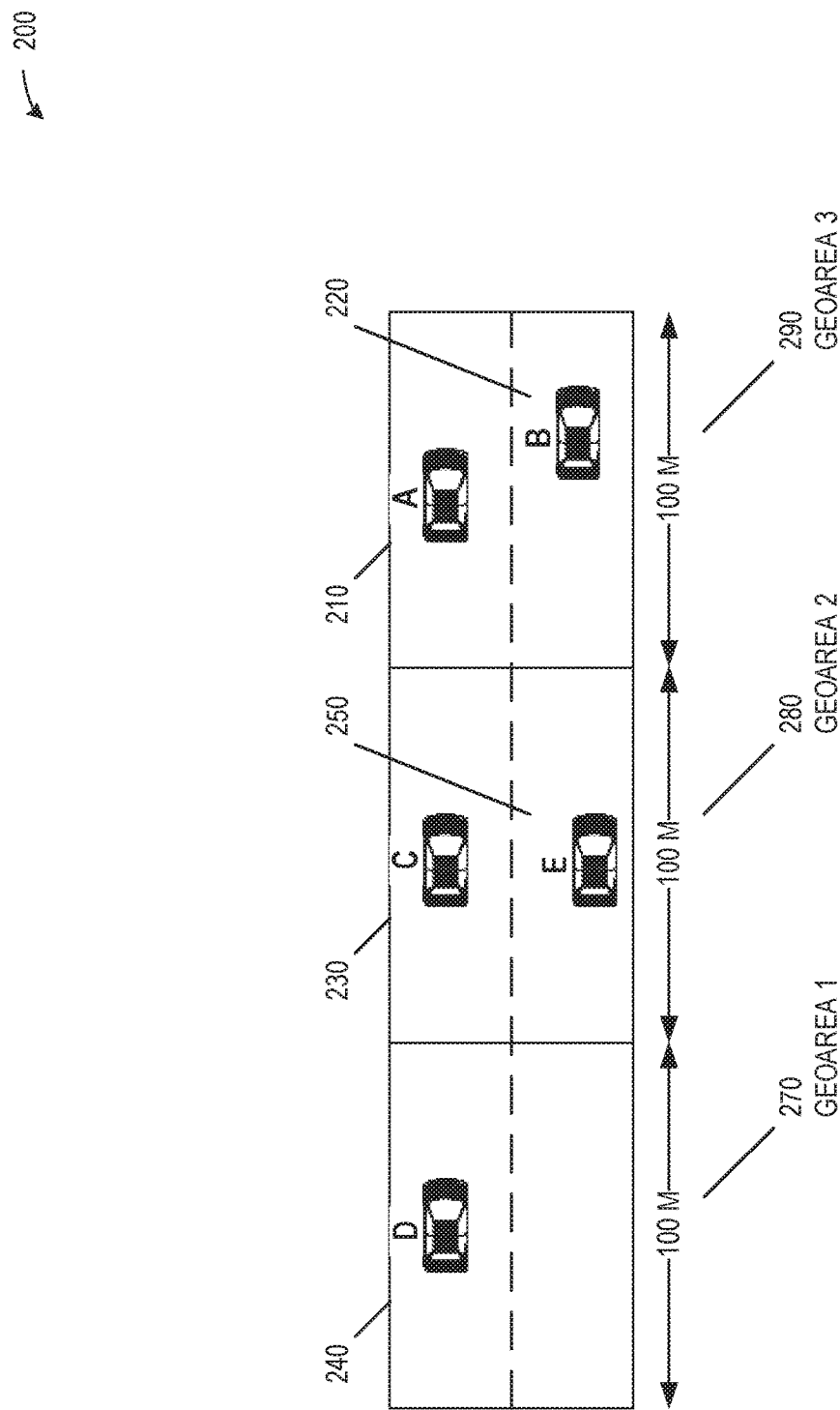
FIG. 2 is block diagram of a road topology, according to an embodiment.

FIG. 2 is block diagram of a road topology 200, according to an embodiment. Road topology 200 may be divided into a number of geo-areas, such as GeoArea1 270, GeoArea2 280, and GeoArea3 290. These geo-areas may be formed using a pre-configured dimension, such as 100 meters along a roadway. Each geo-area may be uniquely identifiable using a limited number of characters (e.g., "GeoArea1"). One or more vehicles may be present along the roadway, such as vehicle A 210, vehicle B 220, vehicle C 230, vehicle D 240, and vehicle E 250. Each vehicle may use its vehicle location to determine the identifier of its current geo-area, such as vehicle A 210 determining it is within GeoArea3 290.

Figure 3:
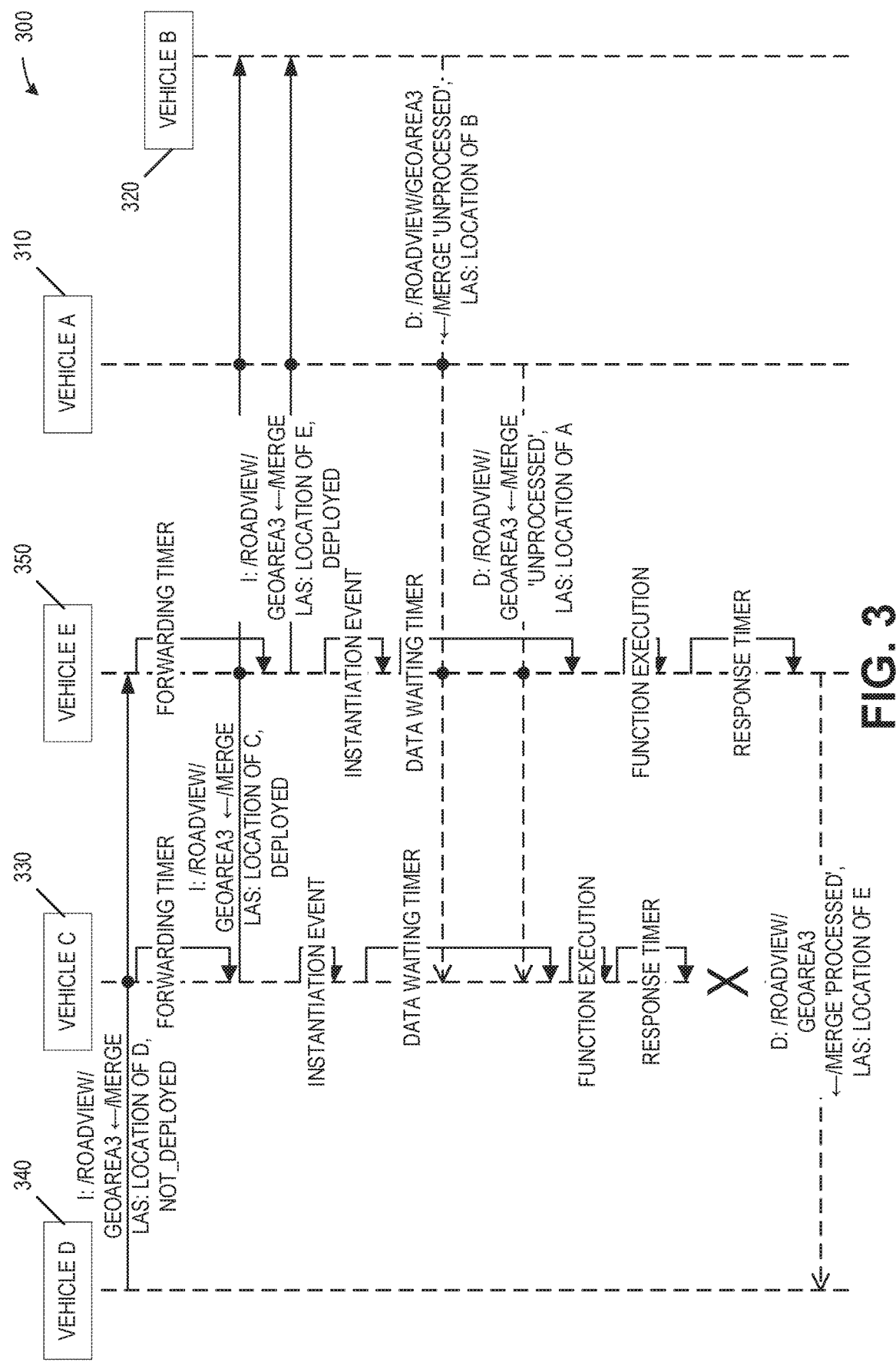
FIG. 3 is a block diagram of an example message flow, according to an embodiment.

FIG. 3 is a block diagram of an example message flow 300, according to an embodiment. Message flow 300 may be used among various vehicles to provide the redundant function pre-launching process, such as for the road topology 200 shown in FIG. 2. Message flow 300 may include vehicle D 340 sending an interest packet to apply a 'merge' function over road views captured by multiple vehicles within an area called 'geoArea3'. The interest packet may include "/roadView/location=geoArea3←/merge/delay_requirement=100 ms/pre_launching_allowed=true/partial_results_allowed=false." The forwarding logic of vehicle D 340 may be used to isolate a function part from a data part of the same name. For example, it may isolate a function part "/merge/delay_requirement=100 ms/pre_launching_allowed=true/partial_results_allowed=false" from a data part (e.g., a reference to input data of the function) of the name "/roadView/location=geoArea3". For the data part, the forwarding logic may determine a distance between its own geo-area and a desired geo-area. The forwarding logic may identify a need to propagate the interest packet further to fetch data. For the function part, the forwarding logic may retrieve data from an associated FFIB, which may be used to determine that the function executable for "/merge" is available both locally and in nearby geo-area. The FFIB data may be based on a FFIB table, such as shown in Table 1 below:

TABLE 1

FFIB Data Table

| FFIB | Prefix | Face(s) |
|------|--------|---------|
| D | /merge | $Face_{MERGE}$ |
| D | /merge | $Face_{RADIO}$, GeoArea2 |
| C | /merge | $Face_{MERGE}$ |
| C | /merge | $Face_{RADIO}$, GeoArea3 |
| C | /merge | $Face_{MERGE}$ |
| C | /merge | $Face_{RADIO}$, GeoArea3 |
| A | /merge | $Face_{RADIO}$, GeoArea3 |
| B | /merge | $Face_{RADIO}$, GeoArea3 |

In an example, the forwarding logic may consult with the orchestration strategy, and the orchestration strategy may determine a need to offload execution to a node within a nearby geo-area, such as to provide response data that will be closer to the vehicle. In response to this determination, the interest packet is broadcast and a flag is added (e.g., "not_deployed") to the header of LAS indicating that the function has not been launched. The LAS header may also contain the location of the sender to facilitate geo-location-based interest packet forwarding.

Upon reception of interest packet, forwarding logic of both vehicle C 330 and vehicle E 350 may consult with their respective orchestration strategies and FDDs. Each vehicle may operate based on their respective geo-areas, based on FFIB information that indicates locally available "/merge" executables, and based on geo-area mentioned in the interest packet. Using this information, each vehicle may decide independently to execute the "/merge" function locally and start a forwarding timer with two different values, such as a value chosen randomly, or a value calculated based on a given function.

In an example, the timer for vehicle C 330 may start first. Vehicle C 330 may verify that pre-launching is allowed based on the interest packet, and then may instantiate the function immediately to warm up after re-broadcasting or forwarding the interest packet. While re-broadcasting the interest packet, the LAS of vehicle C 330 may add a tag associated with the function has been deployed. When vehicle E 350 receives this broadcast from vehicle C 330, vehicle E 350 may count a number of received interest packets with "deployment" tag and verify whether the redundancy count in interest packet has been reached. If the redundancy count is reached, vehicle E 350 may cancel its forwarding timer. If the redundancy count is not reached, vehicle E 350 may continue to run the forwarding timer as shown in message flow 300 and re-broadcast the interest packet again with an LAS "deployment" flag.

Vehicle C 330 and vehicle E 350 may also create two PIT entries. A first PIT entry may include the original interest packet name and a corresponding face set to a geo-location augmented radio face. A second PIT entry may include the data part of the name and a corresponding face set to a local interface to function execution framework. The lifetime of the first PIT entry may be set to a sum of a data waiting timer and an estimation function execution time. After creating these PIT entries, both vehicle C 330 and vehicle E 350 may run a waiting timer to collect data as multiple vehicles from the desired location may respond to the interest packet. The PIT information may be stored in a table, such as Table 2 shown below:

TABLE 2

PIT Data Table

| PIT | Interest | Face(s) |
|-----|----------|---------|
| D | /roadView/geoArea3 ←/merge | FaceAPP |
| C | /roadView/geoArea3 ←/merge | FaceRADIO, GeoArea1 |
| C | /roadView/geoArea3 | FaceMERGE |
| E | /roadView/geoArea3 ←/merge | FaceRADIO, GeoArea1 |
| E | /roadView/geoArea3 | FaceMERGE |
| A | /roadView/geoArea3 ←/merge | FaceRADIO, GeoArea1 |
| B | /roadView/geoArea3 ←/merge | FaceRADIO, GeoArea1 |

Vehicle A 310 and vehicle B 320 may receive multiple interest packets but take advantage of native PIT aggregation logic within ICN to avoid redundant entries in their respective PIT tables. While responding with a data packet, vehicle A 310 and vehicle B 320 may add an "unprocessed" tag to the packet indicating that they are responding only to the data part. With this additional "unprocessed" tag, the data packet may keep using the same name as an interest packet, where the name includes both function and name parts. Because vehicle A 310 and vehicle B 320 are within the same desired area indicated in the interest packet, they both respond with data packets containing their respective perspective or view of the same area. Once a data waiting timer completes, both vehicle A 310 and vehicle B 320 complete processing the data by executing the function independently. In addition to the forwarding timer, a response timer is used to coordinate data packet transmission within a neighborhood.

In an example, vehicle C 330 may exit the road abruptly or suffer from a system failure before its response timer expires. In such a case, the response timer of vehicle E 350 eventually expires, resulting in vehicle D 340 receiving a computing result from vehicle E 350. As a result, the data packet from vehicle E 350 contains a "processed" tag.

The FDD may be implemented in various configurations. In various embodiments, the FDD may be run in a cluster-head or Road Side Unit (RSU) where it may dictate which nodes should start pre-launching a function. A cluster approach may reduce or eliminate a straggler problem by introducing redundant function deployment. As such, a clustered-based approach may benefit distributed machine learning applications, model update applications, or MapReduce-type applications.

Figure 4:
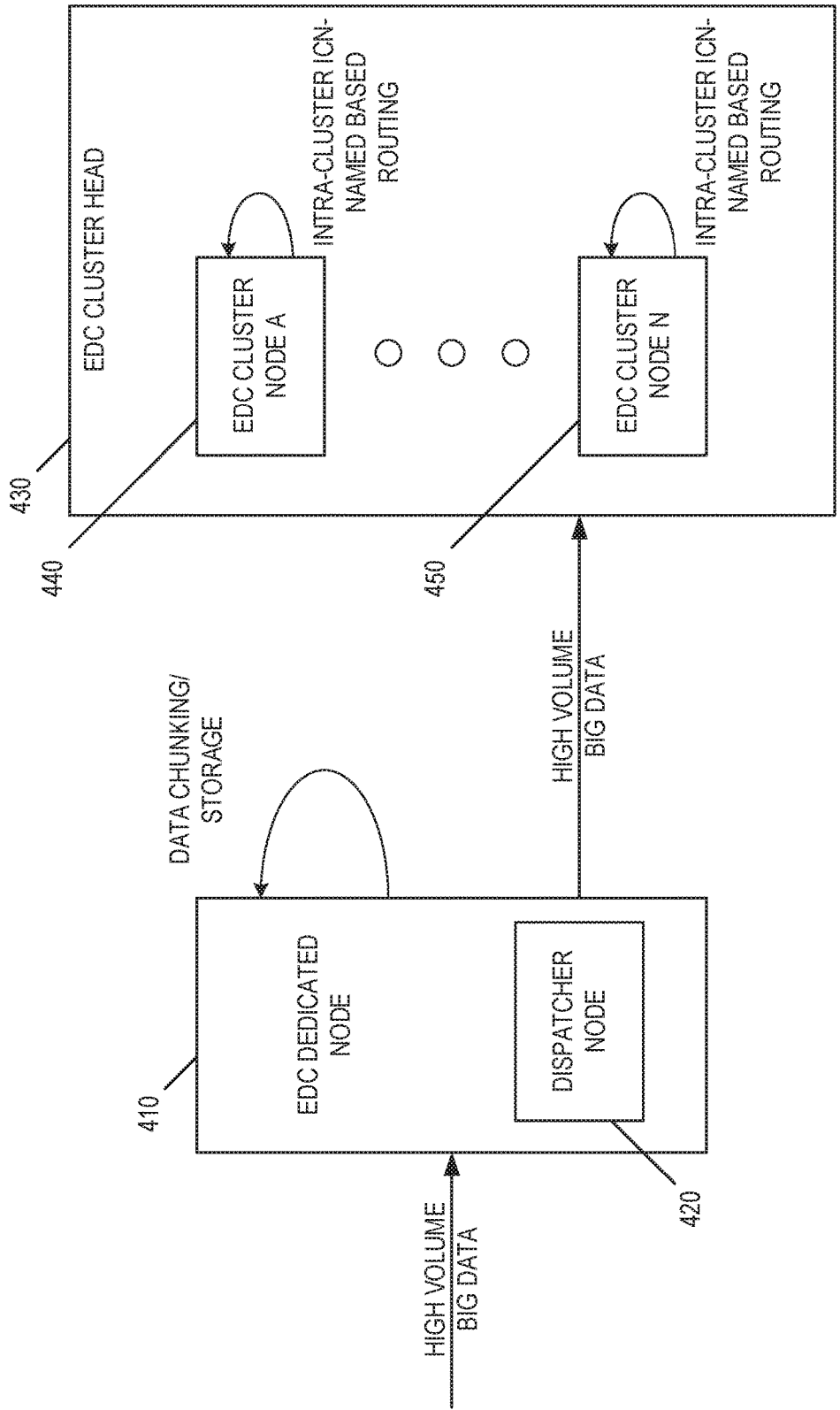
FIG. 4 is a block diagram of an ICN-based edge data center (EDC) system, according to an embodiment.

FIG. 4 is a block diagram of an ICN-based edge data center (EDC) system 400, according to an embodiment. EDC system 400 may be used to improve EDCs based on ICN naming and routing in data storage and processing distribution. EDCs may follow a distributed network-of-servers approach in data centers. However, in contrast with typical data centers, EDCs provide more lower-end server capabilities, which is useful for network configurations deployed based on a significant number of lower-end servers. Systems may increasingly rely on wireless connectivity between servers for network backhaul connectivity, such as for upcoming fifth generation cellular network technology (e.g., 5G mmWave band operation). This network backhaul connectivity may provide connectivity between network servers that may run EDCs, or may pave the way to mmWave wireless connectivity between EDC edge servers.

In further contrast with typical data centers, EDCs cannot follow the same approaches to data storage and distribution of data processing, particularly in typical data center deployments with clusters or server racks that may expand to a large number of servers. For example, in a typical data center deployed with a robust cluster or server rack deployment, a significant amount of data is being distributed across clusters for processing and stored in distributed file systems in clusters (e.g., the Hadoop Distributed File Systems "HDFS"), in which the data is crunched and scheduled for processing across the clusters nodes. However, because EDCs work directly on processed data without a need for significant data storage prior to data processing, the performance of EDCs that include a number of low-end servers is significantly reduced in such distributed processing clusters and in distributed file system storage clusters.

To improve the performance of these EDCs, EDCs may be reconfigured as shown in EDC system 400 to operate based on ICN naming and routing in data storage and processing distribution. In particular, EDC system 400 may improve performance by distributing and processing data across EDCs nodes. This applies ICN naming and routing in data storage and processing distribution in EDCs, such as by using ICN hierarchal naming to allow multi-tenant services for the same data stored and processed at the EDC. The use of ICN may benefit from a broadcast feature in wireless communication between EDC servers, such as when using mmWave or similar technology. In an example, the ICN may work as an overlay on top of IP communication between data center servers.

EDC system 400 provides various advantages. For example, EDC system 400 may provide efficient data storage and processing distribution matching EDCs capabilities, matching locality of data coming from or serving IoT and connected or autonomous vehicles services, and allowing multi-tenant services for the same data stored at or processed by the EDC through hierarchal naming. This also improves over edge computing and fog computing implementations, which may function in a silo fashion without resource federation to constitute EDC clusters, and where each edge node functions independently leveraging its own processing capabilities. In contrast, EDC system 400 provides efficient data storage and processing distribution that matches the EDC nodes capabilities (e.g., low-end server nodes), and allows locality-based processing in which the data is dispatched for processing at EDC nodes in proximity.

As shown in FIG. 4, EDC system 400 includes at least one EDC dedicated node 410. Each EDC dedicated node 410 may receive data from data sources based on locality. The data may be separated into data chunks (e.g., data blocks) based on a given specification, and the data chunks may be stored based on a naming convention. The use of a naming convention is in contrast with a key and value pair that may be used in typical data centers. The use of this naming convention may be used to make interactive and contextual data chunks dispatch on processing nodes of the EDCs. The chunked data is stored in file systems referred to as a naming phase, which is analogous to the map phase in a map and reduce configuration in typical data centers.

EDC system 400 may include at least one EDC cluster head 430. For interactive and contextual data chunk dispatch, each of the EDC cluster head 430 may send ICN requests continuously advertising the type of data that the processing nodes in its cluster may process. This expands on the notion of a map and reduces configuration in typical data centers by introducing interactive and contextual data dispatch for processing and leveraging ICN named data.

The EDC cluster head 430 includes multiple nodes, such as EDC cluster node A 440 to EDC cluster node N 450. In operation, multiple EDC cluster nodes may request the same named-data, but may process that data for different purposes based on the type of service to be provided. For example, multi-tenant services may use the same data, such as a single set of road data being used by two different service providers leveraging the same EDC to provide services traffic management and to provide high-definition (HD) maps. The EDC cluster head 430 may distribute the named-data within the multiple nodes for processing based on an intra-cluster ICN named-based routing. The EDC cluster head 430 therefore acts as a dispatcher node for its own cluster, and responds to ICN requests from the processing node within its cluster.

EDC system 400 may include at least one EDC dispatcher node 420. Each EDC dispatcher node 420 may be physically co-located with the EDC dedicated node 410, but may function as a separate logical entity to schedule the processing of named-chunked data through EDC cluster head nodes 430 based on a named match for processing. This scheduling is analogous to the reduce phase in a map and reduces configuration in typical data centers.

Figure 5:
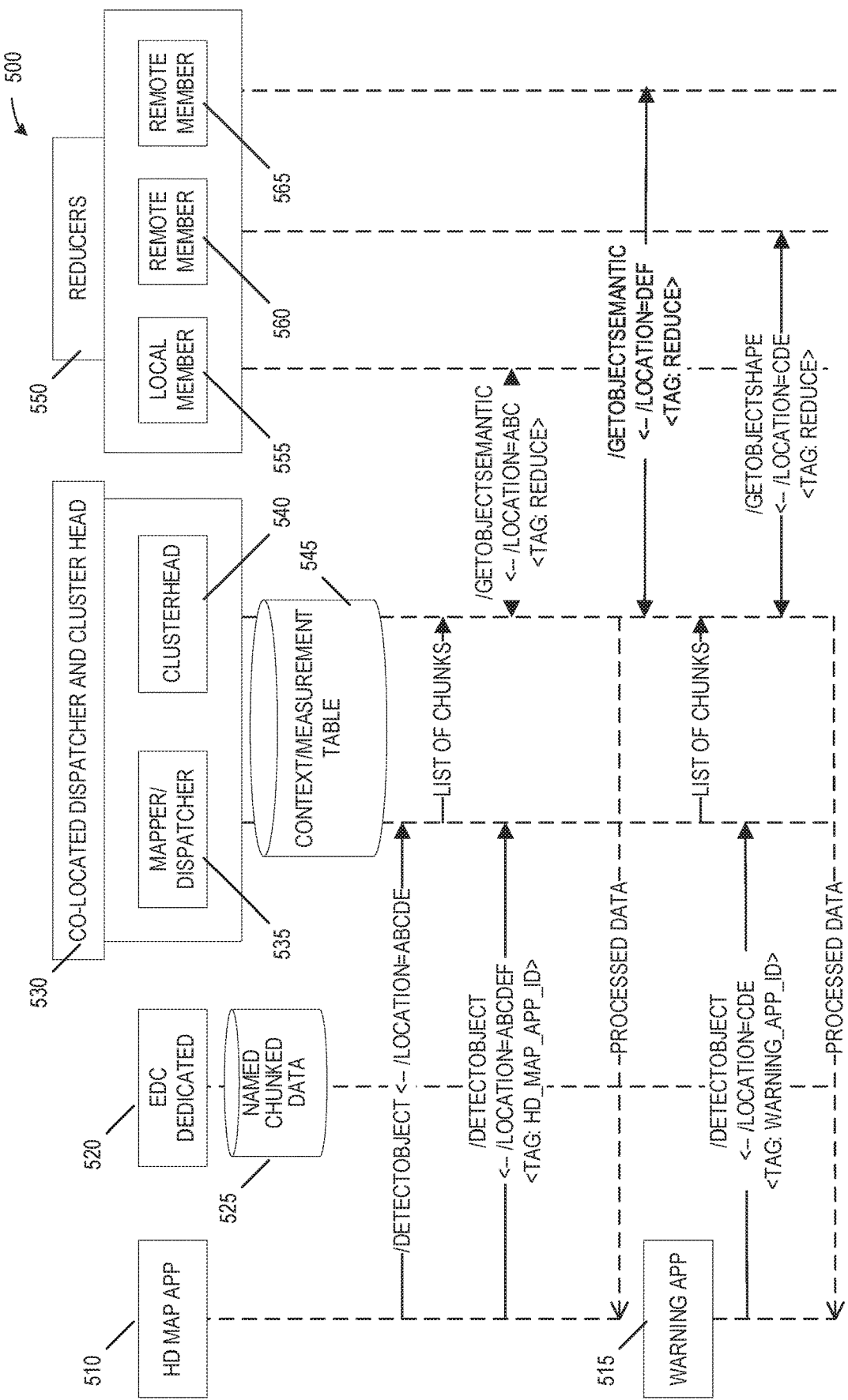
FIG. 5 is a block diagram of an EDC message flow, according to an embodiment.

FIG. 5 is a block diagram of an EDC message flow 500, according to an embodiment. EDC message flow 500 provides an example message flow, such as may be used in multi-tenant (e.g., multi-vehicle) applications. In an example, a first tenant may be running a HD map application 510, and a second tenant may be running a road incident warning application 515, where the warning application 515 may include displaying a dynamic object shape on a windshield for user awareness. Both applications may use geo-tagged camera data from various cars, but each application may include different processing of data. For example, the road incident warning application 515 determines volumetric representation of objects present in the captured view, whereas the HD map application 510 performs semantic segmentation on the captured view to detect type and shape of dynamic objects.

Data for each application may be provided by camera feeds provided to nearby EDC dedicated nodes 520, such as via high speed links (e.g., mmWave). Once the EDC dedicated node 520 receives such a feed, it performs data chunking to generate named chunked data 525 so that further application-specific actions (e.g., finding volumetric shape, performing semantic segmentation) on each data chunk may be performed in parallel to reduce end-to-end latency. Depending on data types and interested applications, a data partitioning or data chunking specification may provide guidelines to chunk data along a video frame, location, time duration, or other data delegation. Each data chunk may be named using an ICN naming convention. Table 3 below shows some example names for chunked video feed:

TABLE 3

Example Names for Data Chunks

/cameraview/frame1/location=abc
/cameraview/frame1/location=cde
/cameraview/frame2/location=cde
/cameraview/frame3/location=cde
/cameraview/frame4/location=xvz Each edge data center may include a cluster of low-end hosts, where one co-located dispatcher and cluster head host 530 may include a cluster head 540 and mapper or dispatcher 535 to manage or orchestrate data distribution. The cluster head 540 may be used to collect data processing capability information of its member nodes, such as local member 555, first remote member 560, or second remote member 565, and may periodically share aggregated capability information with neighboring cluster heads. This discovery mechanism of processing capabilities across clusters may be designed and implemented on top of layer 2 protocols. The discovery mechanism may be implemented as a standalone module, or may be integrated with an ICN prefix advertisement process of the routing protocol. Each cluster head 540 may maintain such information in a measurement and context table 545 to help the dispatcher node make context-aware intelligent decisions on dispatching processing tasks to nodes from other clusters. An example of the measurement and context table 545 maintained by each cluster head are shown in Table 4:

TABLE 4

Example Context Information Maintained at Cluster Head

| Next Hop Cluster Head ID | Supported Data Format (JSON) | Processing Capability (JSON) |
|---|---|---|
| 1 | {type: video, resolution: 300x300} | {GPU_Read_BW: 4 GB/sec} |
| 2 | {type: video, resolution: 600x600} | {GPU_Write_BW: 2 GB/sec} |
| 3 | {type: audio, rate: 16 Khz} | {CPU: 3.5 GHz, RAM: 2 GB} |
| 4 | {type: audio, rate: 8 Khz} | {CPU: 2.5 GHz, RAM: 2 GB} |

If cluster head 540 and dispatcher 535 are not the same node, this context information maintained at cluster head 540 may be shared among cluster heads and dispatchers.

The road incident warning application 515 or HD map application 510 may request processed output using ICN interest packets. The interest packet may include a name indicating the data in which the requester is interested. For example, the name may include "/detectObject←/location=abcdef."

To improve the operation of the system, EDC message flow 500 may include adding metadata to the interest packet to differentiate application type and tenants, such as "(APPLICATION_ID, TENANT_ID)." Based on the available contextual and route information, the dispatcher may determine a list of data chunks to be processed, and may dispatch the data chunks to either local cluster heads or to a set of neighboring cluster heads using interest packets with corresponding chunk names. EDC message flow 500 may also include a tag including "REDUCE" into the interest packet to indicate that it is a request for processing data. The cluster head then manages forwarding of interest packets to its member nodes, such as local member 555, first remote member 560, or second remote member 565. Finally, a reducer 550 may be used with member nodes to perform an application-specific reduction process, such as determining object shape or semantic scene segmentation.

Figure 6:
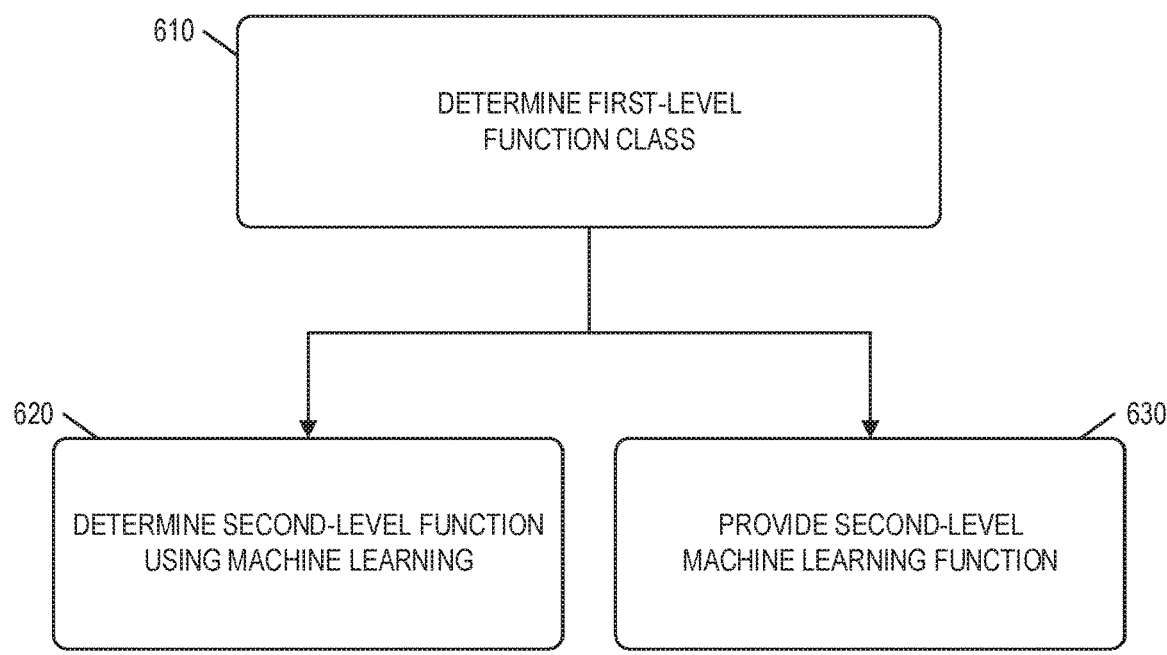
FIG. 6 is a block diagram of a machine learning function determination 600, according to an embodiment.

FIG. 6 is a block diagram of a machine learning function determination 600, according to an embodiment. While ICNs may decouple location from the naming of objects, named functional networks (NFNs) allow manipulation of objects as part of the name that is used to request the object. The functions in NFNs are typically static, but the NFN scheme lends itself to allowing recursion where one function is the actual output of another function. Machine learning function determination 600 may include determination of the first-level function class 610, followed by determination of the second-level function 620 using machine-learning. In an example, the first level function may include bandwidth reduction, and machine learning may be used to determine whether to use lossy video compression or non-lossy data compression (e.g., bzip).

Machine learning function determination 600 may further include providing a second-level machine learning function 630, where the function itself could be a learned function. For example, instead of the determination of the second-level function 620 using machine-learning based on multiple choices for the second-level function, the machine learning algorithm itself could be the second level function that changes depending on the data and the requests. In an example, this second-level machine learning function may provide a desired class of compression to use for a given data and input. The second-level machine learning function may include a trained machine learning algorithm that is further defined by weights and hyperparameters provided as inputs to the algorithm. For example, for a set of input data features, power, latency, and other relevant input attributes, the parameters of the machine learning algorithm (e.g., the weights of a neural network) could be selected based on those inputs. Alternatively, a pre-trained machine learning algorithm that has been published in the network may be used as a service, where the pre-trained algorithm may be referred to using just an algorithm name. In an example, a computing node itself may already have access to the second function, in which case it may apply the second function to obtain the compression level. In another example, the node may forward a second function into a network, where a compute node may be used to serve the function as a service.

In an example of the determination of the second-level function 620, the function may include an "average( )" function, such as "nfn:///mountains/switzerland/jungfrau/ (average {locations/snowdepth})." In this example, a machine learning algorithm may select the implementation of this function (e.g., how much data to average), and select the nodes over which this average function will be executed upon. The NFN name may be used to indicate a machine learning average function to be applied, such as identifying the function based on parameters and hyperparameters. A machine learning algorithm may also select a machine learning based function (e.g., MLAveraging) from among a class of averaging functions. The class of averaging functions may include various pre-trained machine learning models organized by complexity, and the selection of the function may be based on computing an average while optimizing the given criteria. As used herein, "optimization" refers to selecting a combination of inputs or a particular function that improves or maximizes the efficiency of the function, data processing, or overall system operation.

In an example of the second-level machine learning function 630, the average( ) function itself could be an MLaverage( ) function whose parameters change as a function of the input attributes, the data, and the network. A robust weighted average may improve the optimization of the function. For example, an appropriate weighted average may be used, such as when the network automatically detects that some of the values from certain locations are erroneous due to sensor faults or that data is skewed in certain locations. This use of an appropriate weighted average may be used when a typical average function may be based on enough outlier data to result in skewed results. When using a weighted average or other weighted function, the weights of the function may adapt over time to improve the reliability of the output. The weights of a function may also be selected based on various system parameters, such as power consumption, latency, data quality, or other parameters. Using these features, the second-level machine learning function 630 provides an adaptive machine learning algorithm (e.g., a deep neural net) whose parameter values may change over time depending on the application requirements and network and node dynamics.

Machine learning function determination 600 provides various advantages. As infrastructure is changing and improving, an existing application may now be adjusted dynamically during the application lifetime, such as to provide improved user experience without major redesigns of the application itself. Because functionality may be inserted intelligently into the path of how objects are addressed, functionality may be applied to applications that were designed before such functionality was available or created. The use of this adaptive machine learning function determination 600 therefore may leverage newer generations of hardware, such as hardware that was introduced after the application was deployed. As a result, despite commoditization and abstraction of hardware on many levels, an end-user may directly benefit from newer hardware functionality.

An additional advantage of machine learning function determination 600 includes a triple-late binding. This triple-late binding includes a binding of (a) the object to be addressed, (b) the algorithm and implementation to be applied, and (c) the resources used to execute (2) in a coherent and transparent way to the application, yet allowing the application to influence the behavior.

This solution also provides advantages over solutions that perform transparent optimization based on the infrastructure, where the application cannot adjust its behavior based on that information. For example, this solution provides the ability to react to a situation where the power consumption of an IoT edge device exceeds the remaining battery power, such as by allowing the application to make adjustments to influence other participants of the solution. This solution also provides advantages over solutions by avoiding difficult reconfiguration or API mapping procedures that are specific to a particular implementation of the framework and the application, such as by providing a solution that adapts to various implementations of the framework and the application.

Machine learning function determination 600 may include a shift from host-based names (e.g., http://host.com/ object) to ICN names (e.g., icn:///mountains/switzerland/ jungfrau/top/snowdepth). This shift from host-based names to ICN names may be advanced to leverage NFN by inserting functions into the request of the object (e.g., nfn:///mountains/switzerland/jungfrau/(average {locations/ snowdepth})).

Machine learning function determination 600 may be implemented traditionally, such as by summing scalar values and dividing the result by the number of values. Determination 500 may be improved using the availability of small logic blocks to parallelize groups of additions and improve the speed of operations. The benefit provided by switching from the serial to the parallel function may depend on various factors, such as the amount of data or the available resources.

In an example, machine learning function determination 600 uses telemetry data of the underlying service platform in combination with machine learning to select which implementation and which resources lead to an optimal result. The determination of which implementation and which resources lead to an optimal result may be based on various optimization criteria, such as least amount of power, shortest latency, largest data transfer bursts, processor with highest security assurance class, highest fault tolerance, or other optimization criteria. As these implementations are being executed, they in turn generate telemetry data. This telemetry data may be fed back into the optimization, thereby further improving performance by allowing for constant adjustment and adaptability to satisfy a dynamically updating optimality criterion. For example, a first determination of implementation and resources may be based on a shortest latency optimization criteria, and after reducing latency, a second determination of implementation and resources may be based on a least amount of power optimization criteria.

Figure 7:
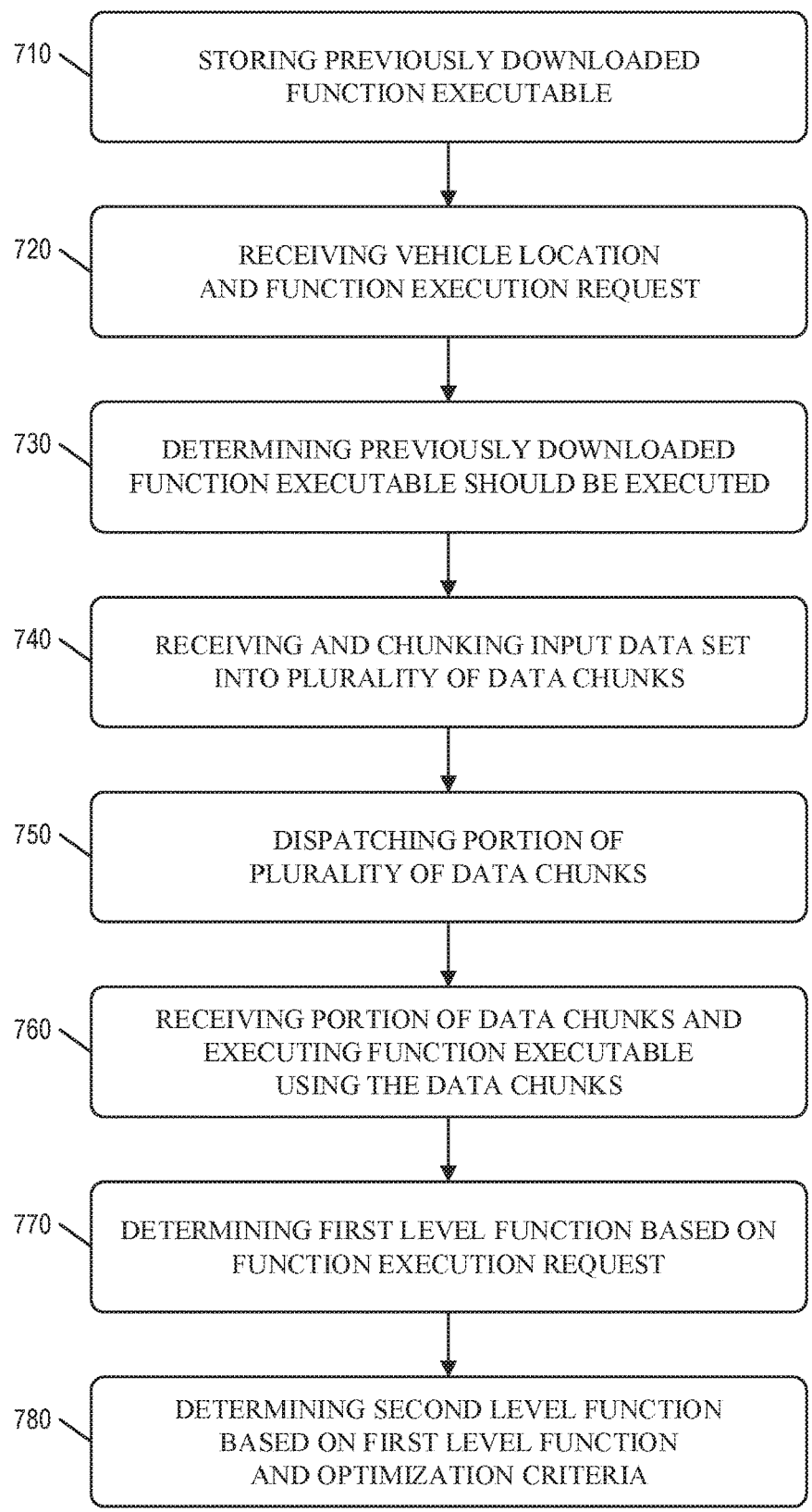
FIG. 7 is an example of a method for network function execution, according to an embodiment.

FIG. 7 is an example of a method 700 for network function execution, according to an embodiment. The operations of the method 700 are implemented in computing hardware, such as that described above in FIGS. 1-6, or below in FIG. 8 (e.g., processing circuitry).

Operation 710 may include storing a previously downloaded function executable, such as within a function executable storage device. Operation 720 may include receiving a vehicle location and a function execution request, such as within a function deployment decider. The vehicle location may be provided by a link adaptation shim, and may be embedded within a packet header by the link adaptation shim. Operation 730 may include determining that the previously downloaded function executable should be executed. The determination of execution may be based on the vehicle location and the function execution request. The function execution request may include an indication of an output time indicating when a result of the function execution request will be needed, and the function deployment decider may determine a pre-launch time of the execution of the previously downloaded function executable based on the output time. The determination of execution may be based further on at least one of a local computing capability, a data communication latency, a data communication cost, and a redundancy factor. The determination of execution may be based further on a per-hop function deployment status from the link adaptation shim.

Operation 740 may include receiving an input data set and chunking the input data set into a plurality of data chunks, such as at an edge data center dedicated node. Operation 750 may include dispatching a portion of the plurality of data chunks, such as from the edge data center dedicated node through a dispatcher node to an edge data center cluster head node. Operation 760 may include receiving the portion of the plurality of data chunks and executing the function executable using the plurality of data chunks.

Operation 770 may include determining a first level function based on the function execution request. Operation 780 may include determining a second level function based on the determined first level function and on a plurality of function optimization criteria. The determination of the second level function may be based on an application of machine learning to the determined first level function and to the plurality of function optimization criteria. The second level function may include a machine learning function that operates based on the plurality of function optimization criteria.

Figure 8:
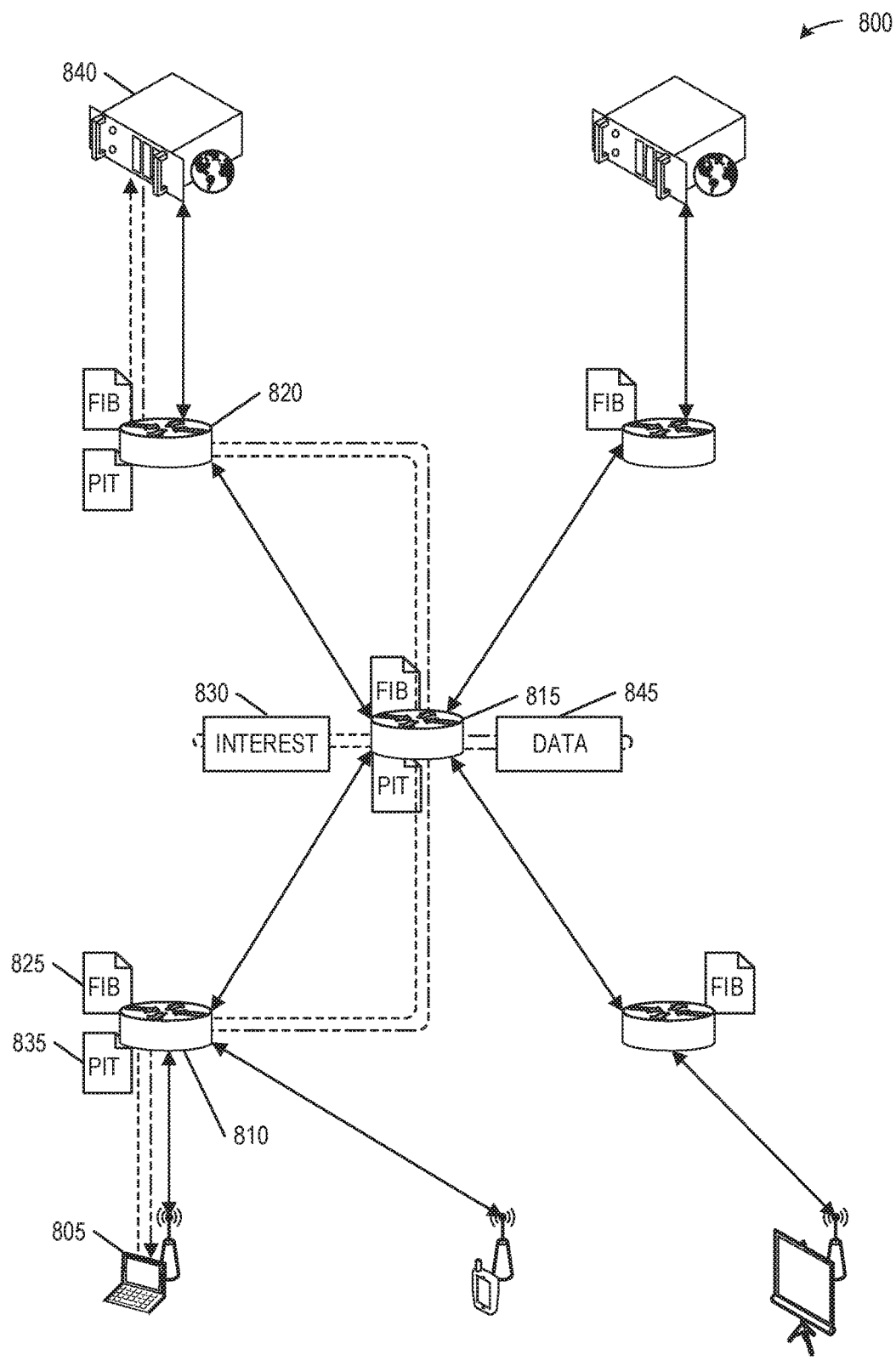
FIG. 8 illustrates an example ICN, according to an embodiment.

FIG. 8 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 805 (e.g., subscriber) requests named content from the network itself. The content request may be called an interest and transmitted via an interest packet 830. As the interest packet traverses network devices (e.g., network elements, routers, switches, hubs, etc.)—such as network elements 810, 815, and 820—a record of the interest is kept, for example, in a pending interest table (PIT) at each network element. Thus, network element 810 maintains an entry in its PIT 835 for the interest packet 830, network element 815 maintains the entry in its PIT, and network element 820 maintains the entry in its PIT.

When a device, such as publisher 840, that has content matching the name in the interest packet 830 is encountered, that device 840 may send a data packet 845 in response to the interest packet 830. Typically, the data packet 845 is tracked back through the network to the source (e.g., device 805) by following the traces of the interest packet 830 left in the network element PITs. Thus, the PIT 835 at each network element establishes a trail back to the subscriber 805 for the data packet 845 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 830 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 830 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 830 to data cached in the ICN element. Thus, for example, if the data 845 named in the interest 830 is cached in network element 815, then the network element 815 will return the data 845 to the subscriber 805 via the network element 810. However, if the data 845 is not cached at network element 815, the network element 815 routes the interest 830 on (e.g., to network element 820). To facilitate routing, the network elements may use a forwarding information base 825 (FIB) to match named data to an interface (e.g., physical port) for the route. Thus, the FIB 825 operates much like a routing table on a traditional network device.

In an example, additional meta-data may be attached to the interest packet 830, the cached data, or the route (e.g., in the FIB 825), to provide an additional level of matching. For example, the data name may be specified as "www.somedomain.com or videos or v8675309," but also include a version number—or timestamp, time range, endorsement, etc. In this example, the interest packet 830 may specify the desired name, the version number, or the version range. The matching may then locate routes or cached data matching the name and perform the additional comparison of meta-data or the like to arrive at an ultimate decision as to whether data or a route matches the interest packet 830 for respectively responding to the interest packet 830 with the data packet 845 or forwarding the interest packet 830.

ICN has advantages over host-based networking because the data segments are individually named. This enables aggressive caching throughout the network as a network element may provide a data packet 830 in response to an interest 830 as easily as an original author 840. Accordingly, it is less likely that the same segment of the network will transmit duplicates of the same data requested by different devices.

Fine grained encryption is another feature of many ICN networks. A typical data packet 845 includes a name for the data that matches the name in the interest packet 830. Further, the data packet 845 includes the requested data and may include additional information to filter similarly named data (e.g., by creation time, expiration time, version, etc.). To address malicious entities providing false information under the same name, the data packet 845 may also encrypt its contents with a publisher key or provide a cryptographic hash of the data and the name. Thus, knowing the key (e.g., from a certificate of an expected publisher 840) enables the recipient to ascertain whether the data is from that publisher 840. This technique also facilitates the aggressive caching of the data packets 845 throughout the network because each data packet 845 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, named data networking (NDN), and named data networking (NDN), as specified in the NDN technical report DND-0001. NDN, as specified in the NDN technical report DND-0001, is a networking architecture that enables communications by named secured data at the network layer. By aligning the network services with application needs, NDN may offer advantages over host-centric networks such as, for example, stronger security and trustworthiness, enhanced network usability, enhanced scalability, and increased resiliency in network communication. NDN is especially suitable for emerging network environments such as edge computing, Internet of Things (IoT), and other data intensive distributed networks.

Other example ICN networks include content centric networking (CCN), as specified in the Internet Engineering Task Force (IETF) draft specifications for CCNx 0.x and CCN 1.x, Data-Oriented Network Architecture (DONA), as presented at proceedings of the 2007 Association for Computing Machinery's (ACM) Special Interest Group on Data Communications (SIGCOMM) conference on Applications, technologies, architectures, and protocols for computer communications, Named Functions Networking (NFN), 4WARD, Content Aware Searching, Retrieval and Streaming (COAST), Convergence of Fixed and Mobile Broadband Access/Aggregation Networks (COMBO), Content Mediator Architecture for Content-Aware Networks (COMET), CONVERGENCE, GreenICN, Network of Information (NetInf), IP Over ICN (POINT), Publish-Subscribe Internet Routing Paradigm (PSIRP), Publish Subscribe Internet Technology (PURSUIT), Scalable and Adaptive Internet Solutions (SAIL), Universal, Mobile-Centric and Opportunistic Communications Architecture (UMOBILE), etc.

Figure 9:
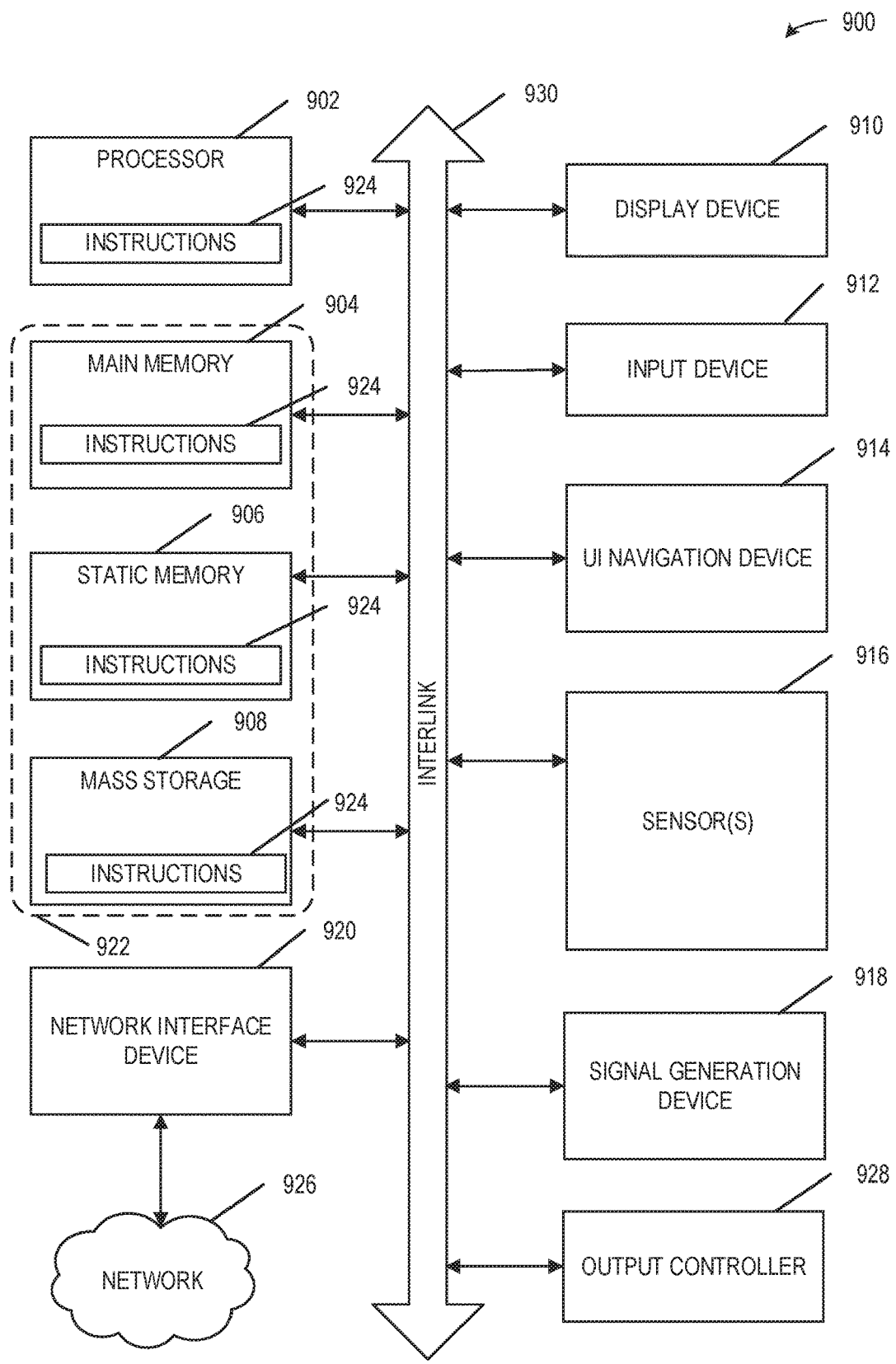
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

ADDITIONAL NOTES & EXAMPLES

Example 1 is a network function execution system comprising: a named function network (NFN) layer including: a function executable storage device to store a previously downloaded function executable; and a function deployment decider to: receive a vehicle location from a link adaptation shim and an NFN interest packet, the NFN interest packet including a function execution request; and determine that the previously downloaded function executable should be executed, the determination of execution based on the vehicle location and the function execution request.

In Example 2, the subject matter of Example 1 optionally includes wherein the function execution request includes an indication of an output time indicating when a result of the function execution request will be needed, the function deployment decider further to determine a pre-launch time of the execution of the previously downloaded function executable based on the output time.

In Example 3, the subject matter of any one or more of Examples 1-2 optionally include wherein the function execution request includes: a pre-launch indication indicating whether pre-launching is allowed for the function execution request; a computation indication indicating whether a partial computation result is acceptable; or a redundancy indication indicating a maximum number of redundant deployments of the function execution request.

In Example 4, the subject matter of any one or more of Examples 1-3 optionally include wherein the determination of execution is further based on at least one of a local computing capability, a data communication latency, a data communication cost, and a redundancy factor.

In Example 5, the subject matter of any one or more of Examples 1-4 optionally include the link adaptation shim to receive the vehicle location and provide the vehicle location to the NFN layer.

In Example 6, the subject matter of Example 5 optionally includes wherein the vehicle location is embedded within a packet header by the link adaptation shim.

In Example 7, the subject matter of any one or more of Examples 1-6 optionally include the function deployment decider further to: receive a local function deployment confirmation; generate, responsive to the receipt of the local function deployment confirmation, a new interest packet pending interest table (PIT) entry, the new interest packet PIT entry indicating a fetching input parameter set for the function execution request; and generate, responsive to the receipt of the local function deployment confirmation, a previous interest packet PIT entry, the previous interest packet PIT entry including a previous PIT entry expiry timer, the previous PIT entry expiry timer based on an input data fetch time and an expected function execution time.

In Example 8, the subject matter of any one or more of Examples 1-7 optionally include the function deployment decider further to: generate a data processing tag to indicate if a source data includes a raw data set or a processed data set, the processed data set generated by applying the previously downloaded function executable to the raw data set, the data processing tag to be used by a receiving node in determining whether a function execution is needed; generate a tagged data set including the data processing tag and a source data.

In Example 9, the subject matter of any one or more of Examples 1-8 optionally include wherein the NFN layer is further to receive a per-hop function deployment status from the link adaptation shim.

In Example 10, the subject matter of any one or more of Examples 1-9 optionally include an edge data center dedicated node to receive an input data set and chunk the input data set into a plurality of data chunks; a dispatcher node to dispatch a portion of the plurality of data chunks; and an edge data center cluster head node to: receive the portion of the plurality of data chunks; and execute the function executable using the plurality of data chunks.

In Example 11, the subject matter of any one or more of Examples 1-10 optionally include the edge data center cluster head node further to receive a plurality of processing capability indications, the plurality of processing capability indications including a data processing capability of a plurality of edge nodes and edge servers.

In Example 12, the subject matter of any one or more of Examples 1-11 optionally include wherein the plurality of processing capability indications including a data processing capability of the edge data center.

In Example 13, the subject matter of any one or more of Examples 11-12 optionally include the edge data center cluster head node further to update the plurality of processing capability indications based on a plurality of processing capability input data.

In Example 14, the subject matter of any one or more of Examples 11-13 optionally include the dispatcher node further to dispatch the portion of the plurality of data chunks based on the plurality of processing capability indications.

In Example 15, the subject matter of any one or more of Examples 11-14 optionally include the dispatcher node further to dispatch metadata to the edge data center cluster head node, the metadata including at least one of an application identification and a tenant identification.

In Example 16, the subject matter of any one or more of Examples 11-15 optionally include the dispatcher node further to dispatch a data scaling tag to the edge data center cluster head node, the data scaling tag including at least one of a request for aggregation of processed output data and a request for reduction of processed output data.

In Example 17, the subject matter of any one or more of Examples 1-16 optionally include the function deployment decider further to: determine a first level function based on the function execution request; and determine a second level function based on the determined first level function and on a plurality of function optimization criteria.

In Example 18, the subject matter of Example 17 optionally includes wherein the determination of the second level function is based on an application of machine learning to the determined first level function and to the plurality of function optimization criteria.

In Example 19, the subject matter of any one or more of Examples 17-18 optionally include wherein the second level function includes a machine learning function that operates based on the plurality of function optimization criteria.

Example 20 is a network function execution method comprising: storing a previously downloaded function executable at a function executable storage device within a named function network (NFN) layer; receiving a vehicle location from a link adaptation shim and an NFN interest packet at a function deployment decider, the NFN interest packet including a function execution request; and determining at the function deployment decider that the previously downloaded function executable should be executed, the determination of execution based on the vehicle location and the function execution request.

In Example 21, the subject matter of Example 20 optionally includes determining a pre-launch time of the execution of the previously downloaded function executable based on an output time, wherein the function execution request includes an indication of the output time, the output time indicating when a result of the function execution request will be needed.

In Example 22, the subject matter of any one or more of Examples 20-21 optionally include wherein the function execution request includes: a pre-launch indication indicating whether pre-launching is allowed for the function execution request; a computation indication indicating whether a partial computation result is acceptable; or a redundancy indication indicating a maximum number of redundant deployments of the function execution request.

In Example 23, the subject matter of any one or more of Examples 20-22 optionally include wherein the determination that the previously downloaded function executable should be executed is further based on at least one of a local computing capability, a data communication latency, a data communication cost, and a redundancy factor.

In Example 24, the subject matter of any one or more of Examples 20-23 optionally include including receiving the vehicle location at the link adaptation shim; and providing the vehicle location from the link adaptation shim to the NFN layer.

In Example 25, the subject matter of any one or more of Examples 20-24 optionally include embedding the vehicle location within a packet header at the link adaptation shim.

In Example 26, the subject matter of any one or more of Examples 20-25 optionally include receiving a local function deployment confirmation at the function deployment decider; generating, at the function deployment decider responsive to the receipt of the local function deployment confirmation, a new interest packet pending interest table (PIT) entry, the new interest packet PIT entry indicating a fetching input parameter set for the function execution request; and generating, at the function deployment decider responsive to the receipt of the local function deployment confirmation, a previous interest packet PIT entry, the previous interest packet PIT entry including a previous PIT entry expiry timer, the previous PIT entry expiry timer based on an input data fetch time and an expected function execution time.

In Example 27, the subject matter of any one or more of Examples 20-26 optionally include generating a data processing tag at the function deployment decider to indicate if a source data includes a raw data set or a processed data set, the processed data set generated by applying the previously downloaded function executable to the raw data set, the data processing tag to be used by a receiving node in determining whether a function execution is needed; generating a tagged data set at the function deployment decider including the data processing tag and a source data.

In Example 28, the subject matter of any one or more of Examples 20-27 optionally include receiving a per-hop function deployment status from the link adaptation shim.

In Example 29, the subject matter of any one or more of Examples 20-28 optionally include receiving an input data set at an edge data center dedicated node; chunking the input data set into a plurality of data chunks at the edge data center dedicated node; dispatching a portion of the plurality of data chunks from a dispatcher node; receiving the portion of the plurality of data chunks at an edge data center cluster head node; and executing the function executable at the edge data center cluster head node using the plurality of data chunks.

In Example 30, the subject matter of any one or more of Examples 20-29 optionally include receiving a plurality of processing capability indications at the edge data center cluster head node, the plurality of processing capability indications including a data processing capability of a plurality of edge nodes and edge servers.

In Example 31, the subject matter of any one or more of Examples 20-30 optionally include wherein the plurality of processing capability indications include a data processing capability of the edge data center.

In Example 32, the subject matter of any one or more of Examples 30-31 optionally include updating the plurality of processing capability indications at the edge data center cluster head node based on a plurality of processing capability input data.

In Example 33, the subject matter of any one or more of Examples 30-32 optionally include dispatching the portion of the plurality of data chunks from the dispatcher node based on the plurality of processing capability indications.

In Example 34, the subject matter of any one or more of Examples 30-33 optionally include dispatching metadata from the dispatcher node to the edge data center cluster head node, the metadata including at least one of an application identification and a tenant identification.

In Example 35, the subject matter of any one or more of Examples 30-34 optionally include dispatching a data scaling tag from the dispatcher node to the edge data center cluster head node, the data scaling tag including at least one of a request for aggregation of processed output data and a request for reduction of processed output data.

In Example 36, the subject matter of any one or more of Examples 20-35 optionally include determining a first level function at the function deployment decider based on the function execution request; and determining a second level function at the function deployment decider based on the determined first level function and on a plurality of function optimization criteria.

In Example 37, the subject matter of Example 36 optionally includes wherein the determination of the second level function is based on an application of machine learning to the determined first level function and to the plurality of function optimization criteria.

In Example 38, the subject matter of any one or more of Examples 36-37 optionally include wherein the second level function includes a machine learning function that operates based on the plurality of function optimization criteria.

Example 39 is at least one machine-readable medium including instructions, which when executed by a computing system, cause the computing system to perform any of the methods of Examples 20-38.

Example 40 is an apparatus comprising means for performing any of the methods of Examples 20-38.

Example 41 is at least one non-transitory machine-readable storage medium, comprising a plurality of instructions that, responsive to being executed with processor circuitry of a computer-controlled device, cause the computer-controlled device to: store a previously downloaded function executable at a function executable storage device within a named function network (NFN) layer; receive a vehicle location from a link adaptation shim and an NFN interest packet at a function deployment decider, the NFN interest packet including a function execution request; and determine at the function deployment decider that the previously downloaded function executable should be executed, the determination of execution based on the vehicle location and the function execution request.

In Example 42, the subject matter of Example 41 optionally includes the instructions further causing the computer-controlled device to determine a pre-launch time of the execution of the previously downloaded function executable based on an output time, wherein the function execution request includes an indication of the output time, the output time indicating when a result of the function execution request will be needed.

In Example 43, the subject matter of any one or more of Examples 41-42 optionally include wherein the function execution request includes: a pre-launch indication indicating whether pre-launching is allowed for the function execution request; a computation indication indicating whether a partial computation result is acceptable; or a redundancy indication indicating a maximum number of redundant deployments of the function execution request.

In Example 44, the subject matter of any one or more of Examples 41-43 optionally include wherein the determination that the previously downloaded function executable should be executed is further based on at least one of a local computing capability, a data communication latency, a data communication cost, and a redundancy factor.

In Example 45, the subject matter of any one or more of Examples 41-44 optionally include the instructions further causing the computer-controlled device to: include receiving the vehicle location at the link adaptation shim; and provide the vehicle location from the link adaptation shim to the NFN layer.

In Example 46, the subject matter of any one or more of Examples 41-45 optionally include the instructions further causing the computer-controlled device to embed the vehicle location within a packet header at the link adaptation shim.

In Example 47, the subject matter of any one or more of Examples 41-46 optionally include the instructions further causing the computer-controlled device to: receive a local function deployment confirmation at the function deployment decider; generate, at the function deployment decider responsive to the receipt of the local function deployment confirmation, a new interest packet pending interest table (PIT) entry, the new interest packet PIT entry indicating a fetching input parameter set for the function execution request; and generate, at the function deployment decider responsive to the receipt of the local function deployment confirmation, a previous interest packet PIT entry, the previous interest packet PIT entry including a previous PIT entry expiry timer, the previous PIT entry expiry timer based on an input data fetch time and an expected function execution time.

In Example 48, the subject matter of any one or more of Examples 41-47 optionally include the instructions further causing the computer-controlled device to: generate a data processing tag at the function deployment decider to indicate if a source data includes a raw data set or a processed data set, the processed data set generated by applying the previously downloaded function executable to the raw data set, the data processing tag to be used by a receiving node in determining whether a function execution is needed; generate a tagged data set at the function deployment decider including the data processing tag and a source data.

In Example 49, the subject matter of any one or more of Examples 41-48 optionally include the instructions further causing the computer-controlled device to receive a per-hop function deployment status from the link adaptation shim.

In Example 50, the subject matter of any one or more of Examples 41-49 optionally include the instructions further causing the computer-controlled device to: receive an input data set at an edge data center dedicated node; chunk the input data set into a plurality of data chunks at the edge data center dedicated node; dispatch a portion of the plurality of data chunks from a dispatcher node; receive the portion of the plurality of data chunks at an edge data center cluster head node; and execute the function executable at the edge data center cluster head node using the plurality of data chunks.

In Example 51, the subject matter of any one or more of Examples 41-50 optionally include the instructions further causing the computer-controlled device to receive a plurality of processing capability indications at the edge data center cluster head node, the plurality of processing capability indications including a data processing capability of a plurality of edge nodes and edge servers.

In Example 52, the subject matter of any one or more of Examples 41-51 optionally include wherein the plurality of processing capability indications include a data processing capability of the edge data center.

In Example 53, the subject matter of any one or more of Examples 51-52 optionally include the instructions further causing the computer-controlled device to update the plurality of processing capability indications at the edge data center cluster head node based on a plurality of processing capability input data.

In Example 54, the subject matter of any one or more of Examples 51-53 optionally include the instructions further causing the computer-controlled device to dispatch the portion of the plurality of data chunks from the dispatcher node based on the plurality of processing capability indications.

In Example 55, the subject matter of any one or more of Examples 51-54 optionally include the instructions further causing the computer-controlled device to dispatch metadata from the dispatcher node to the edge data center cluster head node, the metadata including at least one of an application identification and a tenant identification.

In Example 56, the subject matter of any one or more of Examples 51-55 optionally include the instructions further causing the computer-controlled device to dispatch a data scaling tag from the dispatcher node to the edge data center cluster head node, the data scaling tag including at least one of a request for aggregation of processed output data and a request for reduction of processed output data.

In Example 57, the subject matter of any one or more of Examples 41-56 optionally include the instructions further causing the computer-controlled device to: determine a first level function at the function deployment decider based on the function execution request; and determine a second level function at the function deployment decider based on the determined first level function and on a plurality of function optimization criteria.

In Example 58, the subject matter of Example 57 optionally includes wherein the determination of the second level function is based on an application of machine learning to the determined first level function and to the plurality of function optimization criteria.

In Example 59, the subject matter of any one or more of Examples 57-58 optionally include wherein the second level function includes a machine learning function that operates based on the plurality of function optimization criteria.

Example 60 is a network function execution apparatus comprising: means for storing a previously downloaded function executable at a function executable storage device within a named function network (NFN) layer; means for receiving a vehicle location from a link adaptation shim and an NFN interest packet at a function deployment decider, the NFN interest packet including a function execution request; and means for determining at the function deployment decider that the previously downloaded function executable should be executed, the determination of execution based on the vehicle location and the function execution request.

In Example 61, the subject matter of Example 60 optionally includes means for determining a pre-launch time of the execution of the previously downloaded function executable based on an output time, wherein the function execution request includes an indication of the output time, the output time indicating when a result of the function execution request will be needed.

In Example 62, the subject matter of any one or more of Examples 60-61 optionally include wherein the function execution request includes: a pre-launch indication indicating whether pre-launching is allowed for the function execution request; a computation indication indicating whether a partial computation result is acceptable; or a redundancy indication indicating a maximum number of redundant deployments of the function execution request.

In Example 63, the subject matter of any one or more of Examples 60-62 optionally include wherein the determination that the previously downloaded function executable should be executed is further based on at least one of a local computing capability, a data communication latency, a data communication cost, and a redundancy factor.

In Example 64, the subject matter of any one or more of Examples 60-63 optionally include means for including receiving the vehicle location at the link adaptation shim; and means for providing the vehicle location from the link adaptation shim to the NFN layer.

In Example 65, the subject matter of any one or more of Examples 60-64 optionally include means for embedding the vehicle location within a packet header at the link adaptation shim.

In Example 66, the subject matter of any one or more of Examples 60-65 optionally include means for receiving a local function deployment confirmation at the function deployment decider; means for generating, at the function deployment decider responsive to the receipt of the local function deployment confirmation, a new interest packet pending interest table (PIT) entry, the new interest packet PIT entry indicating a fetching input parameter set for the function execution request; and means for generating, at the function deployment decider responsive to the receipt of the local function deployment confirmation, a previous interest packet PIT entry, the previous interest packet PIT entry including a previous PIT entry expiry timer, the previous PIT entry expiry timer based on an input data fetch time and an expected function execution time.

In Example 67, the subject matter of any one or more of Examples 60-66 optionally include means for generating a data processing tag at the function deployment decider to indicate if a source data includes a raw data set or a processed data set, the processed data set generated by applying the previously downloaded function executable to the raw data set, the data processing tag to be used by a receiving node in determining whether a function execution is needed; means for generating a tagged data set at the function deployment decider including the data processing tag and a source data.

In Example 68, the subject matter of any one or more of Examples 60-67 optionally include means for receiving a per-hop function deployment status from the link adaptation shim.

In Example 69, the subject matter of any one or more of Examples 60-68 optionally include means for receiving an input data set at an edge data center dedicated node: means for chunking the input data set into a plurality of data chunks at the edge data center dedicated node; means for dispatching a portion of the plurality of data chunks from a dispatcher node; means for receiving the portion of the plurality of data chunks at an edge data center cluster head node; and means for executing the function executable at the edge data center cluster head node using the plurality of data chunks.

In Example 70, the subject matter of any one or more of Examples 60-69 optionally include means for receiving a plurality of processing capability indications at the edge data center cluster head node, the plurality of processing capability indications including a data processing capability of a plurality of edge nodes and edge servers.

In Example 71, the subject matter of any one or more of Examples 60-70 optionally include wherein the plurality of processing capability indications include a data processing capability of the edge data center.

In Example 72, the subject matter of any one or more of Examples 70-71 optionally include means for updating the plurality of processing capability indications at the edge data center cluster head node based on a plurality of processing capability input data.

In Example 73, the subject matter of any one or more of Examples 70-72 optionally include means for dispatching the portion of the plurality of data chunks from the dispatcher node based on the plurality of processing capability indications.

In Example 74, the subject matter of any one or more of Examples 70-73 optionally include means for dispatching metadata from the dispatcher node to the edge data center cluster head node, the metadata including at least one of an application identification and a tenant identification.

In Example 75, the subject matter of any one or more of Examples 70-74 optionally include means for dispatching a data scaling tag from the dispatcher node to the edge data center cluster head node, the data scaling tag including at least one of a request for aggregation of processed output data and a request for reduction of processed output data.

In Example 76, the subject matter of any one or more of Examples 60-75 optionally include means for determining a first level function at the function deployment decider based on the function execution request; and means for determining a second level function at the function deployment decider based on the determined first level function and on a plurality of function optimization criteria.

In Example 77, the subject matter of Example 76 optionally includes wherein the determination of the second level function is based on an application of machine learning to the determined first level function and to the plurality of function optimization criteria.

In Example 78, the subject matter of any one or more of Examples 76-77 optionally include wherein the second level function includes a machine learning function that operates based on the plurality of function optimization criteria.

Example 79 is at least one machine-readable medium including instructions, which when executed by a machine, cause the machine to perform operations of any of the operations of Examples 1-78.

Example 80 is an apparatus comprising means for performing any of the operations of Examples 1-78.

Example 81 is a system to perform the operations of any of the Examples 1-78.

Example 82 is a method to perform the operations of any of the Examples 1-78.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:
1. A network function execution system comprising:
    a named function network (NFN) layer including:
        a function executable storage device to store a previously downloaded function executable; and
        a function deployment decider to:
            receive a vehicle location from a link adaptation shim and an NFN interest packet, the NFN interest packet including a function execution request;
            determine that the previously downloaded function executable should be executed, the determination of execution based on the vehicle location and the function execution request;
            generate a data processing tag to indicate whether a source data includes a raw data set or a processed data set, the processed data set generated by applying the previously downloaded function executable to the raw data set, the data processing tag to be used by a receiving node in determining whether a function execution is needed; and generate a tagged data set including the data processing tag and a source data.

2. The system of claim 1, wherein the function execution request includes an indication of an output time indicating when a result of the function execution request will be needed, the function deployment decider further to determine a pre-launch time of the execution of the previously downloaded function executable based on the output time.

3. The system of claim 1, wherein the function execution request includes:
 a pre-launch indication indicating whether pre-launching is allowed for the function execution request;
 a computation indication indicating whether a partial computation result is acceptable; or
 a redundancy indication indicating a maximum number of redundant deployments of the function execution request.

4. The system of claim 1, the function deployment decider further to:
 receive a local function deployment confirmation;
 generate, responsive to the receipt of the local function deployment confirmation, a new interest packet pending interest table (PIT) entry, the new interest packet PIT entry indicating a fetching input parameter set for the function execution request; and
 generate, responsive to the receipt of the local function deployment confirmation, a previous interest packet PIT entry, the previous interest packet PIT entry including a previous PIT entry expiry timer, the previous PIT entry expiry timer based on an input data fetch time and an expected function execution time.

5. The system of claim 1, further including:
 an edge data center dedicated node to receive an input data set and chunk the input data set into a plurality of data chunks;
 a dispatcher node to dispatch a portion of the plurality of data chunks; and
 an edge data center cluster head node to:
  receive the portion of the plurality of data chunks; and
  execute the function executable using the plurality of data chunks.

6. The system of claim 5, the edge data center cluster head node further to receive a plurality of processing capability indications, the plurality of processing capability indications including a data processing capability of a plurality of edge nodes and edge servers.

7. The system of claim 6, the edge data center cluster head node further to update the plurality of processing capability indications based on a plurality of processing capability input data.

8. The system of claim 6, the dispatcher node further to dispatch the portion of the plurality of data chunks based on the plurality of processing capability indications.

9. The system of claim 6, the dispatcher node further to dispatch metadata to the edge data center cluster head node, the metadata including at least one of an application identification and a tenant identification.

10. The system of claim 6, the dispatcher node further to dispatch a data scaling tag to the edge data center cluster head node, the data scaling tag including at least one of a request for aggregation of processed output data and a request for reduction of processed output data.

11. The system of claim 1, the function deployment decider further to:
 determine a first level function based on the function execution request; and
 determine a second level function based on the determined first level function and on a plurality of function optimization criteria.

12. A network function execution method comprising:
 storing a previously downloaded function executable at a function executable storage device within a named function network (NFN) layer;
 receiving a vehicle location from a link adaptation shim and an NFN interest packet at a function deployment decider, the NFN interest packet including a function execution request;
 determining at the function deployment decider that the previously downloaded function executable should be executed, the determination of execution based on the vehicle location and the function execution request;
 generating a data processing tag at the function deployment decider to indicate whether a source data includes a raw data set or a processed data set, the processed data set generated by applying the previously downloaded function executable to the raw data set, the data processing tag to be used by a receiving node in determining whether a function execution is needed; and
 generating a tagged data set at the function deployment decider including the data processing tag and a source data.

13. The method of claim 12, further including determining a pre-launch time of the execution of the previously downloaded function executable based on an output time, wherein the function execution request includes an indication of the output time, the output time indicating when a result of the function execution request will be needed.

14. The method of claim 12, wherein the function execution request includes:
 a pre-launch indication indicating whether pre-launching is allowed for the function execution request;
 a computation indication indicating whether a partial computation result is acceptable; or
 a redundancy indication indicating a maximum number of redundant deployments of the function execution request.

15. The method of claim 12, further including:
 including receiving the vehicle location at the link adaptation shim; and
 providing the vehicle location from the link adaptation shim to the NFN layer.

16. The method of claim 12, further including embedding the vehicle location within a packet header at the link adaptation shim.

17. The method of claim 12, further including:
 receiving a local function deployment confirmation at the function deployment decider;
 generating, at the function deployment decider responsive to the receipt of the local function deployment confirmation, a new interest packet pending interest table (PIT) entry, the new interest packet PIT entry indicating a fetching input parameter set for the function execution request; and
 generating, at the function deployment decider responsive to the receipt of the local function deployment confirmation, a previous interest packet PIT entry, the previous interest packet PIT entry including a previous PIT entry expiry timer, the previous PIT entry expiry timer based on an input data fetch time and an expected function execution time.

18. The method of claim 12, further including:
 receiving an input data set at an edge data center dedicated node;

chunking the input data set into a plurality of data chunks at the edge data center dedicated node;

dispatching a portion of the plurality of data chunks from a dispatcher node;

receiving the portion of the plurality of data chunks at an edge data center cluster head node; and executing the function executable at the edge data center cluster head node using the plurality of data chunks.

19. The method of claim 18, further including receiving a plurality of processing capability indications at the edge data center cluster head node, the plurality of processing capability indications including a data processing capability of a plurality of edge nodes and edge servers.

20. The method of claim 12, further including:

determining a first level function at the function deployment decider based on the function execution request; and determining a second level function at the function deployment decider based on the determined first level function and on a plurality of function optimization criteria.

21. At least one non-transitory machine-readable storage medium, comprising a plurality of instructions that, responsive to being executed with processor circuitry of a computer-controlled device, cause the computer-controlled device to:

store a previously downloaded function executable at a function executable storage device within a named function network (NFN) layer;

receive a vehicle location from a link adaptation shim and an NFN interest packet at a function deployment decider, the NFN interest packet including a function execution request;

determine at the function deployment decider that the previously downloaded function executable should be executed, the determination of execution based on the vehicle location and the function execution request;

generate a data processing tag to indicate whether a source data includes a raw data set or a processed data set, the processed data set generated by applying the previously downloaded function executable to the raw data set, the data processing tag to be used by a receiving node in determining whether a function execution is needed; and generate a tagged data set including the data processing tag and a source data.

22. The non-transitory machine-readable storage medium of claim 13, the instructions further causing the computer-controlled device to determine a pre-launch time of the execution of the previously downloaded function executable based on an output time, wherein the function execution request includes an indication of the output time, the output time indicating when a result of the function execution request will be needed.

23. The non-transitory machine-readable storage medium of claim 21, the instructions further causing the computer-controlled device to:

receive an input data set at an edge data center dedicated node;

chunk the input data set into a plurality of data chunks at the edge data center dedicated node;

dispatch a portion of the plurality of data chunks from a dispatcher node;

receive the portion of the plurality of data chunks at an edge data center cluster head node; and execute the function executable at the edge data center cluster head node using the plurality of data chunks.

\* \* \* \* \*

UNITED STATES PATENT AND TRADEMARK OFFICE
CERTIFICATE OF CORRECTION

PATENT NO. : 11,381,636 B2
APPLICATION NO. : 16/457402
DATED : July 5, 2022
INVENTOR(S) : Alam et al.

It is certified that error appears in the above-identified patent and that said Letters Patent is hereby corrected as shown below:

In the Claims

In Column 30, Line 13, in Claim 22, delete "claim 13," and insert --claim 21,-- therefor Signed and Sealed this
Fourteenth Day of February, 2023

Katherine Kelly Vidal
*Director of the United States Patent and Trademark Office*